United States Patent
Dommaraju et al.

(10) Patent No.: US 7,558,234 B2
(45) Date of Patent: Jul. 7, 2009

(54) SYSTEM AND METHOD FOR CORRELATION OF MOBILE SUBSCRIBER ACTIVITY ACROSS MULTIPLE INTERFACES IN A GPRS NETWORK

(75) Inventors: Seshu Dommaraju, Plano, TX (US); Geoffrey D. Bourne, Allen, TX (US); Wei Dong, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 592 days.

(21) Appl. No.: 11/131,451

(22) Filed: May 17, 2005

(65) Prior Publication Data
US 2006/0262742 A1 Nov. 23, 2006

(51) Int. Cl.
H04W 4/00 (2009.01)
(52) U.S. Cl. ........................ 370/328; 455/415
(58) Field of Classification Search .......... 370/328, 370/335, 338, 342, 389, 392; 455/403, 415, 455/425, 433
See application file for complete search history.

(56) References Cited

U.S. PATENT DOCUMENTS

| | | | |
|---|---|---|---|
| 6,381,306 B1 | 4/2002 | Larson et al. | |
| 6,480,485 B1* | 11/2002 | Kari et al. | 370/352 |
| 6,556,820 B1* | 4/2003 | Le et al. | 455/411 |
| 7,313,108 B2* | 12/2007 | Scobbie | 370/328 |
| 2002/0150096 A1 | 10/2002 | Sjoblom | |
| 2003/0043762 A1* | 3/2003 | Pang et al. | 370/328 |
| 2004/0008650 A1* | 1/2004 | Le et al. | 370/338 |
| 2004/0095894 A1 | 5/2004 | Eloranta et al. | |
| 2004/0157629 A1 | 8/2004 | Kallio et al. | |
| 2004/0264405 A1* | 12/2004 | MacGregor Scobbie | 370/328 |
| 2006/0030295 A1* | 2/2006 | Adams et al. | 455/410 |
| 2006/0183472 A1* | 8/2006 | Nookala et al. | 455/426.1 |
| 2007/0070969 A1 | 3/2007 | Malomsoky et al. | |
| 2008/0045265 A1* | 2/2008 | Yach et al. | 455/556.1 |

FOREIGN PATENT DOCUMENTS

| | | |
|---|---|---|
| WO | 03096729 A1 | 5/2003 |
| WO | WO-03/096729 | 11/2003 |

OTHER PUBLICATIONS

"Universal Mobile Telecommunications System (UMTS); Lawful interception requirements (3GPP TS 33.106 version 5.1.0 Release 5); ETSI TS 133 106" ETSI Standards, European Telecommunications Standard Institute, Sophia-Antipo, FR, vol. 3-SA3, No. V510, Sep. 2002, XP014010224 ISSN: 0000-0001.

"Universal Mobile Telecommunications System (UMTS); Lawful interception requirements (3GPP TS 33.106 Version 5.1.0 Release 5); ETSI TS 133 106" ETSI Standards, European Telecommunications Standard Institute, Sophia-Antipo, FR, vol. 3-SA3, No. V510, Sep. 2002, XP014010224 ISSN: 0000-0001.

* cited by examiner

Primary Examiner—Ricky Ngo
Assistant Examiner—Kan Yuen
(74) Attorney, Agent, or Firm—Fulbright & Jaworski L.L.P.

(57) ABSTRACT

A system and method for subscriber tracking and creating subscriber records in a GPRS network is disclosed. First subscriber records are created using information from first data packets captured from a first GPRS network interface. The first subscriber record is compared with information in second data packets captured from a second GPRS network interface. If the second data packets are associated with the first subscriber record, then information from the second data packets is added to the first subscriber record. If the second data packets are not associated with the first subscriber record, then a second subscriber record is created using information in the second data packets.

27 Claims, 6 Drawing Sheets

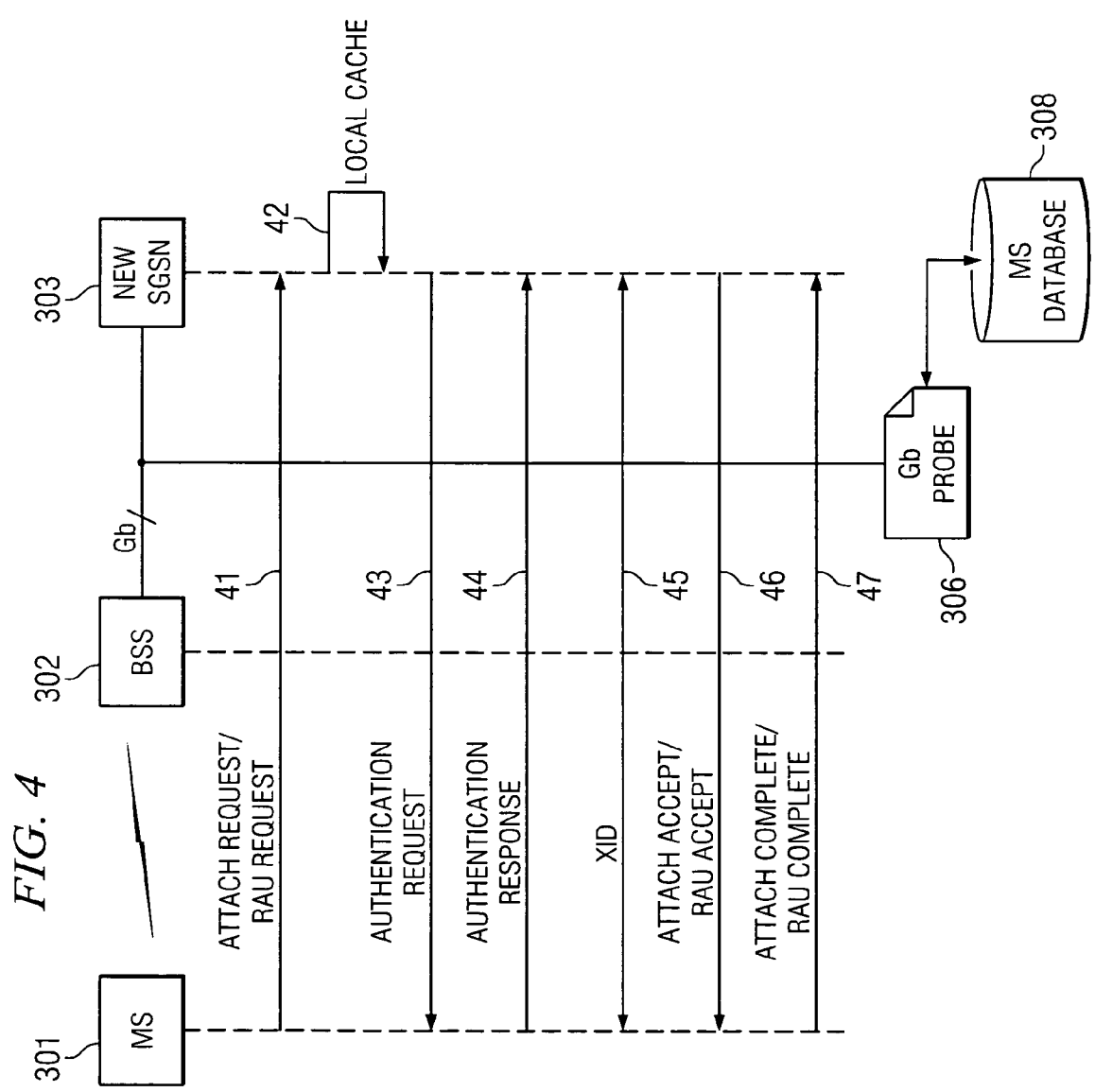

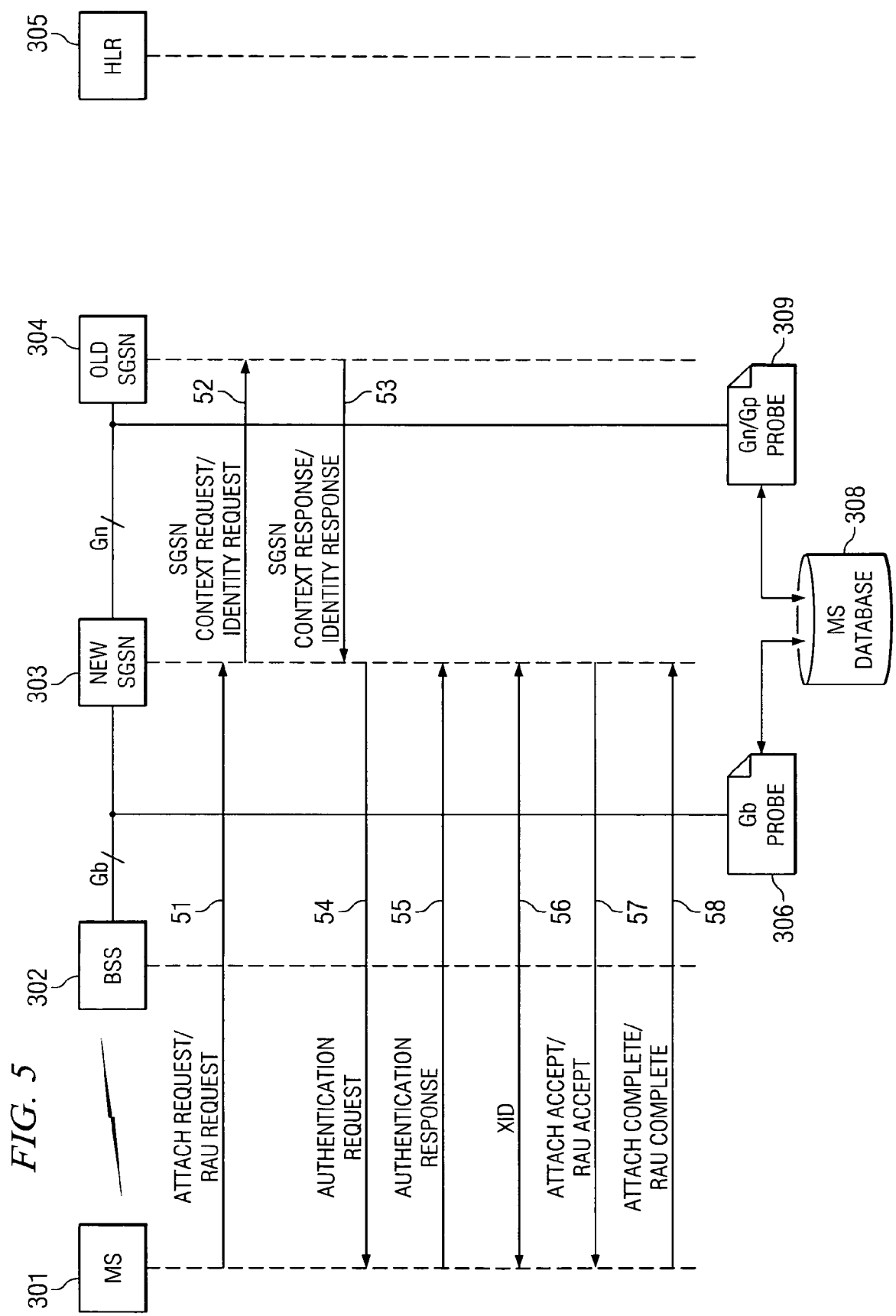

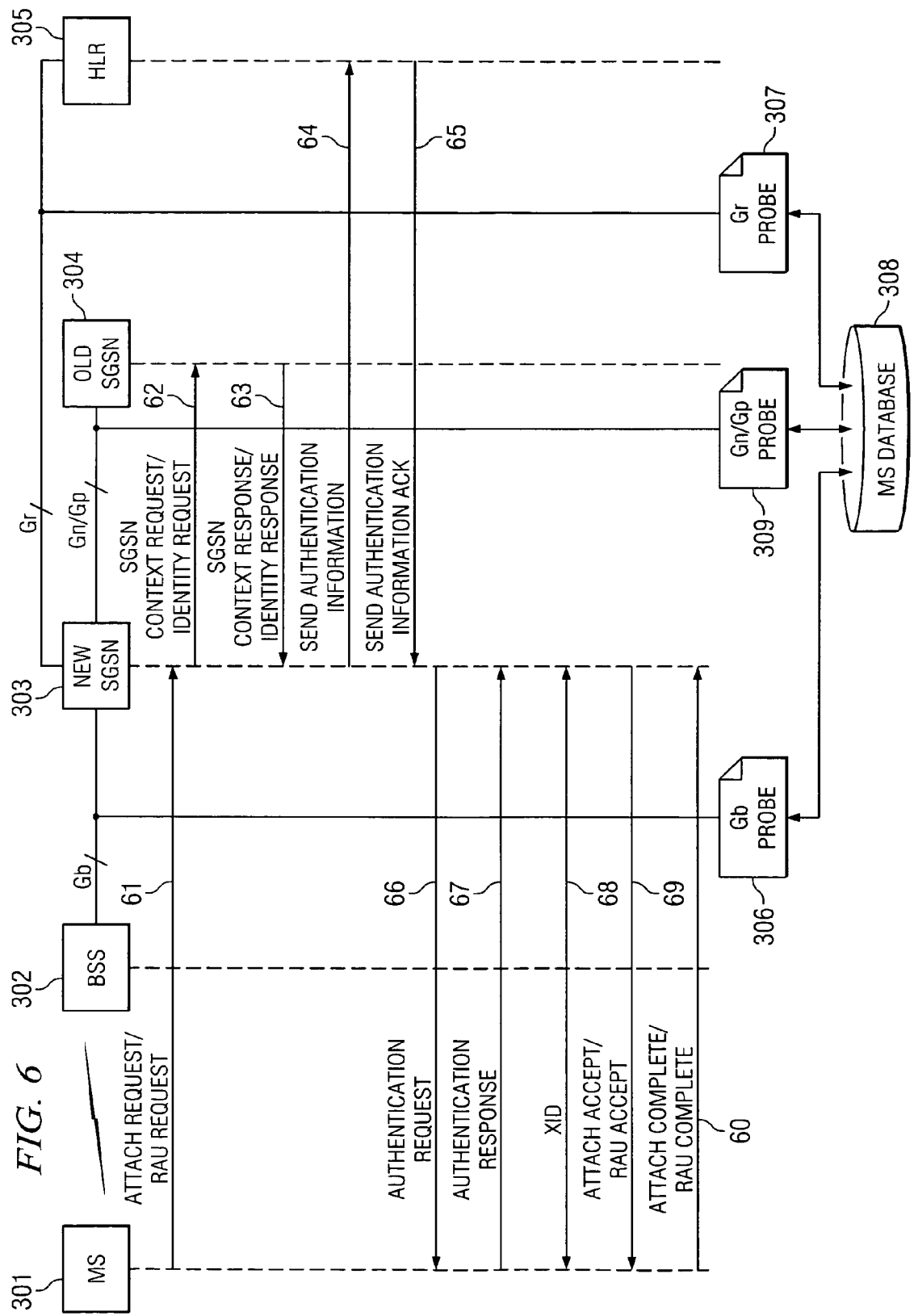

SYSTEM AND METHOD FOR CORRELATION OF MOBILE SUBSCRIBER ACTIVITY ACROSS MULTIPLE INTERFACES IN A GPRS NETWORK

TECHNICAL FIELD

The present invention is directed in general to monitoring messages on GPRS interfaces and, more particularly, to correlating related GPRS messages that are captured from different GPRS interfaces into a single subscriber record.

BACKGROUND

FIG. 1 illustrates the architecture of an exemplary GPRS network 100 that is part of a GSM public land mobile network (PLMN). GSM mobile station (MS) 101 is in communication with base transceiver station (BTS) 102, which provides radio coverage for cell 103. Several BTSs (102, 104) together are controlled by one base station controller (BSC) 105. A BTS and BSC together form a base station subsystem (BSS). The voice traffic for the mobile stations in their respective cells is routed through mobile switching center (MSC) 106, which is connected to the public switched telephone network (PSTN) 108 through gateway mobile switching center (GMSC) 107.

Several data bases are used for call control and network management, including home location register (HLR) 109, MSC/visited location register (VLR) 110, authentication center (AUC) 111, and equipment identity register (EIR) 112. Permanent data, such as the user's profile, as well as temporary data, such as the user's current location, are stored in HLR 109. MSC/VLR 110 is associated with a group of location areas and stores data for those users who are currently in its area of responsibility. This includes parts of the permanent user data that have been transmitted from HLR 109 to MSC/VLR 110 for faster access. MSC/VLR 110 may also assign and store local data such as a temporary identification. AUC 111 generates and stores security-related data, such as keys used for authentication and encryption. EIR 112 registers equipment data rather than subscriber data.

In addition to telephone numbers, subscriber identifiers, and equipment identifiers, several other identifiers have been defined to help manage GSM subscriber mobility and for addressing the network elements. The international mobile station equipment identity (IMEI) uniquely identifies a mobile station similar to a serial number. The IMEI is allocated by the equipment manufacturer and registered by the network operator who stores it in the EIR. Each registered user is uniquely identified by an international mobile subscriber identity (IMSI), which is stored in the subscriber identity module (SIM). A mobile station can only be operated if a SIM with a valid IMSI is inserted into equipment with a valid IMEI.

A given subscriber is identified by a mobile subscriber ISDN number (MSISDN), which is assigned to the subscriber's SIM. A mobile station set can have several MSISDNs depending on the SIM that is installed. The VLR, which is responsible for the current location of a subscriber, can assign a temporary mobile subscriber identity (TMSI) which has only local significance in the area handled by the VLR. It is stored on the network side only in the VLR and is not passed to the HLR.

GPRS support nodes (GSN) integrate GPRS into GSM architecture. GSNs are responsible for the delivery and routing of data packets between mobile stations and external packet data networks (PDN). All GSNs are connected via an IP-based GPRS backbone network. Within the backbone, the GSNs encapsulate the PDN packets and transmit (tunnel) them using the GPRS Tunneling Protocol GTP. Serving GPRS support node (SGSN) 113 is responsible for the delivery of data packets from and to mobile stations, such as MS 101, within its service area. GPRS 113 performs packet routing and transfer, mobility management, such as attach/detach and location management, logical link management, and authentication and charging functions. A location register of SGSN 113 stores location information, such as current cell and current VLR, and user profiles, such as the IMSI or other addresses used in the packet data network, for all the GPRS users registered with SGSN 113.

Gateway GPRS support node (GGSN) 114 acts as an interface between the GPRS backbone network and external packet data network (PDN) 115. GGSN 114 converts GPRS packets coming from SGSN 113 into the appropriate packet data protocol (PDP) format, such as IP or X.25, and sends the packets out on PDN 115. In the other direction, PDP addresses of incoming data packets are converted to the GSM address of the destination user, such as MS 101. The re-addressed packets are sent to SGSN 113, which is serving MS 101. GGSN 114 stores the current SGSN address of the user and his or her profile in its location register.

There is a many-to-many relationship between SGSNs and GGSNs in a GPRS network. A single GGSN may serve as the interface to external packet data networks for several SGSNs. Alternatively, a single SGSN may route its packets over different GGSNs to reach different packet data networks. For example, SGSN 113 may be coupled to SGSN/GGSN 116 in a different PLMN 117.

FIG. 1 also illustrates the various ETSI-defined interfaces between the network nodes. The Gb interface connects BSC 105 with SGSN 113. The Gn interface connects SGSNs in the same PLMN. The Gp interface is used to connect SGSNs and GGSNs in separate PLMNs. The Gi interface connects the PLMN with external public or private PDNs, such as the Internet or corporate intranets. Using the Gf interface, SGSN 113 may query EIR 112 regarding the IMEI of a mobile station trying to register with the network.

HLR 109 stores the user profile, the current SGSN address, and the PDP address(es) for each GPRS user in the PLMN. The Gr interface is used to exchange this information between HLR 109 and SGSN 113. For example, SGSN 113 informs HLR 109 about the current location of MS 101. When MS 101 registers with a new SGSN, HLR 109 will send the user profile to the new SGSN. The Gc interface between GGSN 114 and HLR 109 may be used by GGSN 114 to query a user's location and profile in order to update its location register. MSC/VLR 110 may include functions and register entries that allow coordination between packet-switched (GPRS) and circuit-switched (conventional GSM) services. For this purpose, the Gs interface connects the data bases of SGSN 113 and MSC/VLR 110. The Gd interface interconnects SMS gateway MSC (SMS-GMSC) 118 with SGSN 113 to exchange short message service (SMS) messages via GPRS.

Before MS 101 can use GPRS services, it must register with SGSN 113 of the GPRS network. SGSN 113 checks if the user is authorized, copies the user profile from HLR 109 and assigns a packet temporary mobile subscriber identity (P-TMSI) to the user. This procedure is called GPRS attach. For mobile stations using both circuit switched and packet switched services it is possible to perform combined GPRS/IMSI attach procedures. The disconnection from the GPRS network is called GPRS detach. The mobile station or the network can initiate the GPRS detach.

After a successful GPRS attach, MS 101 must apply for one or more addresses used in PDN 115 to exchange data packets with devices, such as server 119, in external PDN 115. For example, MS 101 must be assigned an IP address if PDN 115 is an IP network. This address is called a PDP (Packet Data Protocol) address. For each session, a PDP context is created, which describes the characteristics of the session. The PDP context contains the PDP type, the PDP address assigned to the mobile station, the requested quality of service, and the address of GGSN 114 that serves as the access point to PDN 115. This context is stored in MS 101, SGSN 113, and GGSN 114. With an active PDP context, MS 101 is "visible" to external PDN 115 and is able to send and receive data packets. The mapping between the two addresses, PDP and IMSI, enables GGSN 114 to transfer data packets between PDN 115 and MS 101. A user may have several simultaneous PDP contexts active at a given time.

The allocation of the PDP address can be static or dynamic. In the first case, the network operator of the user's home-PLMN permanently assigns a PDP address to the user. In the second case, a PDP address is assigned to the user upon activation of a PDP context. The PDP address can be assigned by the operator of the user's home-PLMN (dynamic home-PLMN PDP address) or by the operator of the visited network (dynamic visited-PLMN PDP address). The home network operator decides which of the possible alternatives may be used. In case of dynamic PDP address assignment, the GGSN is responsible for the allocation and the activation/deactivation of the PDP addresses.

It is difficult to monitor and track related GPRS packets as they are communicated on different interfaces between various network nodes. This is because each packet may include different parameters. Accordingly, there is a need in the prior art to correlate packets that are exchanged in the GPRS network.

SUMMARY OF THE INVENTION

The present invention provides a system and method for creating subscriber records in a GPRS system. Monitoring probes are used to capture signaling units, messages, or data packets that are exchanged across the various interfaces in the GPRS network. There are a number of parameters that may be associated with a particular subscriber's connection, such as IMSI, TLLI, NodeId, PTMSI, RAND UI, Algorithm Type, Triplet Index, MSISDN, Routing Area Index, and Authentication Triplet (Kc, RAND, SRES), which are further defined in TABLE 1 below. However, each message will not include all of these parameters. Therefore, there is a need for a system and method to correlate related messages into a single subscriber record using the messages that are captured from different GPRS interfaces.

When a subscriber has an active session or context, information is exchanged across the GPRS interfaces. Different types of messages are exchanged across different interfaces. It is an object of the invention to create a subscriber record for each new context in the GPRS network. A new subscriber record is created for each GPRS interface message that cannot be correlated to an existing record. The subscriber records are then updated as additional messages are captured. When information is added to an existing record, the updated record may also be compared to other subscriber record to determine whether multiple records should be combined.

By correlating the subscriber information into a single record, it is possible to use information collected on one interface to analyze messages captured on another interface. For example, the messages on the Gb interface may be encrypted and, therefore, their contents cannot be read without the keys required to decrypt the message. The keys are available from messages on other interfaces, such as the Gr, Gn, or Gp interfaces. By correlating all of the information into a single subscriber record, messages on the Gb interface may be decrypted using the keys that are captured from related messages on another interface.

Even though subscriber identities, such as IMSI, are not always transmitted in all messages on all interfaces, the present subscriber tracking invention provides the capability to filter on subscribers' identities, even when the identity does not exist in the messages that are part of the call. These filtering capabilities are supported for both real-time and historical analysis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 illustrates a system for creating subscriber records according to an exemplary embodiment of the present invention;

FIG. 5 illustrates a system for creating subscriber records according to an exemplary embodiment of the present invention; and FIG. 6 illustrates a system for creating subscriber records according to an exemplary embodiment of the present invention.

DETAILED DESCRIPTION

Figure 1:
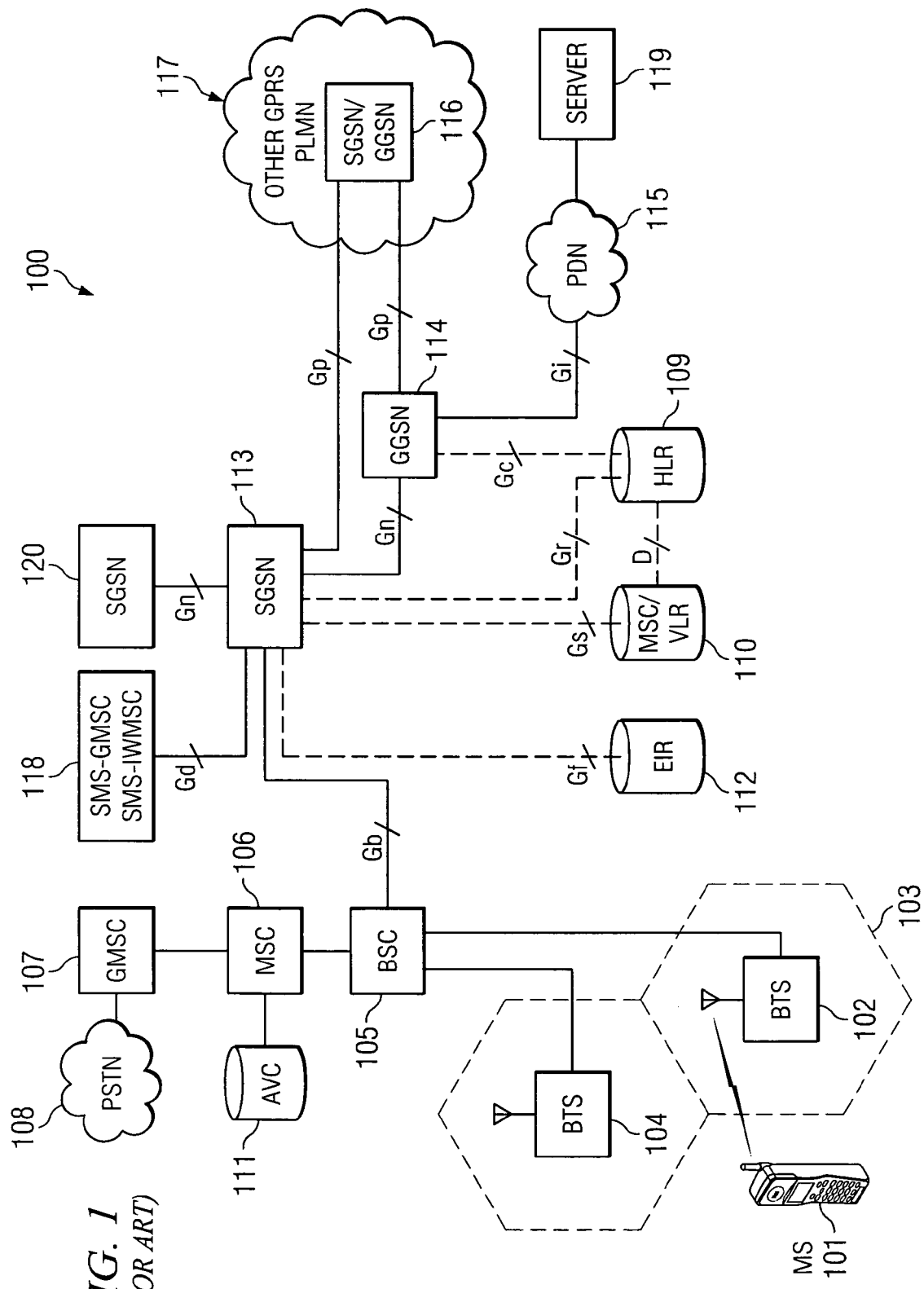
FIG. 1 is a block diagram of a GPRS network.
Figure 2:
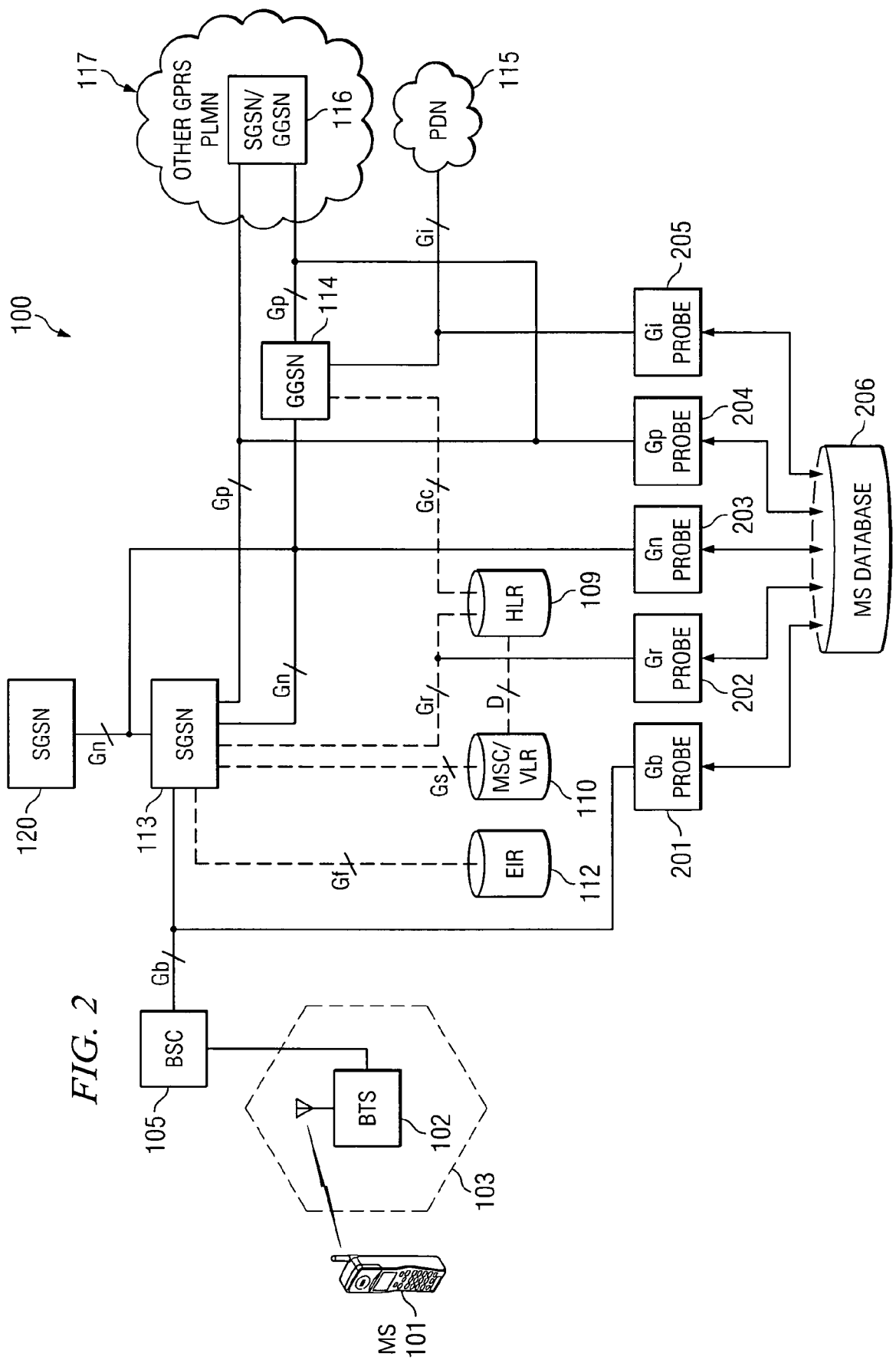
FIG. 2 is a block diagram of a monitored GPRS network according to one exemplary embodiment of the present invention.

FIG. 2 illustrates a GPRS network with monitoring probes according to an exemplary embodiment of the present invention. One or more monitoring probes may be coupled to the communications links between the components of the GPRS network. In a preferred embodiment, the probes capture substantially all of the packets or messages that pass across the communication links. The probes are transparent to the GPRS network and do not directly affect the operation of the GPRS network. Preferably, the probes may be connected at any available point on the communication links.

Gb Probe 201 captures and monitors the packets and messages transferred across the Gb interface between BSC 105 and SGSN 113. Gr Probe captures and monitors the packets and messages transferred across the Gr interface between SGSN 113 and HLR 109. Gn Probe 203 captures and monitors the packets and messages transferred across the Gn interfaces. Gp Probe 204 captures and monitors the packets and messages transferred across the Gp interfaces. Gi Probe captures and monitors the packets and messages transferred across the Gi interface between GGSN 114 and PDN 115. It will be understood by those of ordinary skill that the various probes may be combined so as to monitor multiple links of the same or different types. For example, Gn Probe 203 and Gp Probe 204 may be combined in an alternate embodiment as a single Gn/Gp Probe (not shown).

It will be understood that other monitoring probes may be coupled to the communications links for other interfaces not listed above, such as the Gf, Gs, Gc, or Gd interfaces. Monitoring Probes 201-205 create a subscriber record from the captured packets and messages. In an alternative embodiment, monitoring probes 201-205 are coupled to each other (not shown) so that captured packets and messages may be exchanged among the monitoring probes. This allows an individual monitoring probe to create subscriber records using messages and packets captured from different network interfaces.

Monitoring probes 201-205 send the subscriber records to mobile station (MS) database 206, which tracks and stores mobile subscriber information. It will be understood by those of ordinary skill that MS database 206 may be incorporated within one of the monitoring probes 201-205 or may be a separate component. In an embodiment in which MS database 206 is part of one of the monitoring probes, it will be understood that the other monitoring probes can access database 206 in the hosting probe. Monitoring probes 201-205 can access the records stored on database 206 by other monitoring probes so that the records can be updated with information captured from other network interfaces.

The subscriber records stored in MS database 206 include one or more of the parameters listed in TABLE 1. It will be understood that this list is exemplary and that other parameters may also be included in the subscriber record in other embodiments.

TABLE 1

| Field | Description |
| --- | --- |
| Subscriber Identification | Unique subscriber identity number, created by MS database or by monitoring system |
| IMSI | International Mobile Subscriber Identity |
| TLLI | Temporary Logical Link Identity |
| NodeId | Unique network node identifier, created by MS database or by monitoring system |
| PTMSI | Temporary Mobile Subscriber Identity for the Packet Network |
| RAND UI | Random number generated by the SGSN, used as part of input parameter in ciphering |
| Algorithm Type | Current ciphering algorithm used by SGSN to cipher MS data |
| Triplet Index | Identifier to identify the authentication triplet in use |
| MSISDN | Mobile Subscriber International PSTN/ISDN Number |
| GMT Time | Record creation time |
| OC Array | Overflow counters per NSAPI, used as input parameters for ciphering algorithm |
| RAI | Routing Area Id |
| Authentication Triplet | Ciphering keys - consists of Kc, RAND, and SRES |

Each captured packet includes only a portion of the above-listed elements. Accordingly, a single packet does not provide sufficient information to create a complete record for a subscriber. Using the present invention, the parameters stored for two or more records may be compared to identify related records and to then combine the information from multiple records that are associated with a single mobile subscriber.

Figure 3:
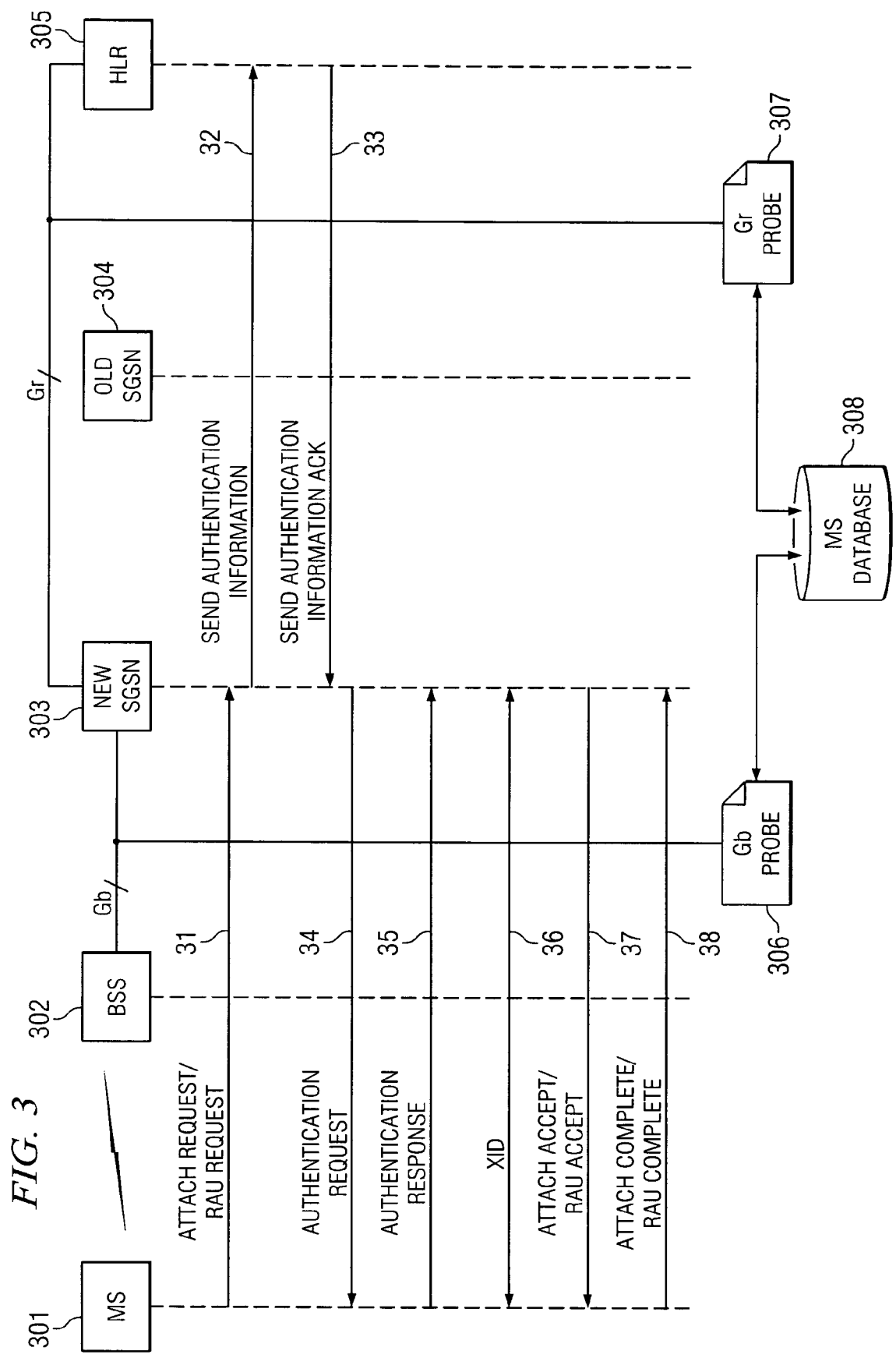
FIG. 3 illustrates a system for creating subscriber records according to an exemplary embodiment of the present invention.

FIG. 3 illustrates data packets and messages that are captured from the Gb and Gr interfaces in one embodiment of the invention. FIG. 3 represents a scenario in which SGSN 303 receives an attach request from MS 301. In this scenario, MS 301 is previously unknown to SGSN 303, for example, because MS 301 was previously communicating through SGSN 304. SGSN 303 does not have authentication keys available for MS 301 and must retrieve the authentication keys from HLR 305.

MS 301 sends attach request/RAU request message 31 to SGSN 303 through BSS 302, which provides coverage for MS 301's current cell. Message 31 is transmitted across the Gb interface from BSS 302 to SGSN 303 and is captured by Gb Probe 306. Gb Probe 306 creates a Gb interface subscriber record using the IMSI parameter extracted from attach request message 31. The Gb interface subscriber record is then stored to MS database 308. Gb Probe 306 may extract IMSI, PTMSI, TLLI and RAI information from attach request message 31. All of this information may then be included in the Gb interface subscriber record.

SGSN 303 requests authentication keys from HLR 305 by transmitting Send Authentication Info message 32 across the Gr interface. In response, HLR 305 sends Send Authentication Info Ack message 33 back to SGSN 303 across the Gr interface. Gr Probe 307 captures messages 32 and 33, and updates the existing Gb interface subscriber record for MS 301 using the IMSI parameter that is extracted from message 32. Gr Probe 307 adds the Authentication Triplets (Kc, RAND and SRES) that are extracted from message 33 to the Gb interface subscriber record.

In an alternate embodiment, attach/RAU request message 31 does not include the optional IMSI parameter. In this scenario, Gb Probe 306 creates a Gb interface subscriber record for MS 301 using PTMSI information and forwards the Gb subscriber record to MS database 308. Gr Probe 307 creates a separate Gr interface subscriber record for MS 301 using the IMSI information from Send Authentication Info and Send Authentication Info Ack messages 32 and 33. The Send Authentication Info messages do not include PTMSI information and, therefore, cannot immediately be correlated to the existing Gb subscriber record for MS 301. The new Gr subscriber record from Gr Probe 307 is also sent to MS database 308.

The Gr and Gb subscriber records may be completed or further filled out using data extracted from the other messages exchanged between SGSN 303 and MS 301. Authentication Request 34 and Authentication Response 35 messages are exchanged across the Gb interface to authenticate the mobile subscriber. These messages are captured by Gb Probe 306, which recognizes the TLLI information as corresponding to an existing subscriber record. Gb Proble 306 updates its existing Gb subscriber record for MS 301 by adding the RAND and IMSI information from messages 34 and 35.

The updated Gb subscriber record is provided to MS database 308, which searches for duplicate or related entries. The RAND and SRES information can be used to match information collected from the Gb interface with the information collected from the Gr interface. The Gr subscriber record is then merged with the updated Gb subscriber record for MS 301. Similarly, messages 36-38 are exchanged across the Gb interface to complete the attach request, and these messages are captured by Gb Probe 306 and are used to further update the merged subscriber record.

TABLE 2 illustrates the data that is extracted from the messages captured in FIG. 3. This data is then used to create the records in MS database 308.

TABLE 2

| Message | Extracted Data |
| --- | --- |
| 31 - Attach Request/RAU Request | IMSI, PTMSI, TLLI, RAI |
| 32 - Send Authentication Info | IMSI |
| 33 - Send Authentication Info Ack | Authentication Triplets (Kc, RAND, SRES) |
| 34 - Authentication Request | TLLI, Authentication Type, RAND |
| 35 - Authentication Response | TLLI, SRES |
| 36 - XID | RAND-UI |
| 37 - Attach Accept/RAU Accept | PTMSI, TLLI |
| 38 - Attach Complete/RAU Complete | TLLI |

FIG. 4 illustrates another embodiment of the present invention. In FIG. 4, SGSN 303 has the required authentication keys or uses its own cache of keys, so no authentication key exchange is required as part of the attach. MS 301 sends attach request message 41 to SGSN 303, and Gb Probe 306 captures message 41. Gb Probe 306 creates a new Gb subscriber record using either the IMSI information extracted from message 41. If the IMSI information is not available, the new Gb record is created using the PTMSI information.

Message 42 is a query to a local cache memory at SGSN 303 to retrieve the authentication triplets (Kc, RAND, and SRES). This information is used to create authentication request message 43, which is also captured by Gb Probe 306. In the scenario illustrated by FIG. 4, SGSN 303 ciphers mobile subscriber data using keys stored in a local cache. These keys were fetched from a previous look up to HLR 305, so a new look up, such as message 32, is not required. Subscriber information, such as the authentication triplets, may be stored permanently in the subscriber database so that the Gb Probe can mimic the behavior of SGSN 303.

Authentication information, such as RAND and SRES, is collected from messages 43 and 44; and the TLLI information in messages 43 and 44 is used to correlate these message to the existing Gb subscriber record that was created upon detection of message 41. Additional information is collected from messages 45-47 as they are captured by Gb Probe 306. TABLE 3 lists the information that can be captured from the messages in FIG. 4 and that can be used to create and match subscriber records.

TABLE 3

| Message | Extracted Data |
| --- | --- |
| 41 - Attach Request/RAU Request | IMSI, PTMSI, TLLI, RAI |
| 43 - Authentication Request | TLLI, Authentication Type, RAND |
| 44 - Authentication Response | TLLI, SRES |
| 45 - XID | RAND-UI |
| 46 - Attach Accept/RAU Accept | PTMSI, TLLI |
| 47 - Attach Complete/RAU Complete | TLLI |

FIG. 5 illustrates another embodiment of the present invention in which authentication keys are available on another SGSN and must be transferred to a new SGSN as part of an attach request. Attach request 51 is captured by Gb Probe 306 and is used to create a new Gb subscriber record, as described above for messages 31 and 41. Probe 306 sends the Gb subscriber record to database 308. SGSN 303 receives message 51 and queries SGSN 304 via message 52 for authentication information. SGSN 304 returns the authentication information in message 53.

Messages 52 and 53 are sent across the Gn interface and are captured by Gn/Gp Probe 309, which creates a new Gn/Gp subscriber record based upon the information in messages 52 and 53. Gn/Gp Probe 309 sends the Gn/Gp subscriber record to database 308, which correlates the Gn/Gp record to the Gb subscriber record by matching parameters such as the IMSI or TLLI information, for example.

The attach process is complete via messages 54-58, in the same manner as described above for messages 34-38 and 43-47, and as known to those of ordinary skill. TABLE 4 lists the information that can be captured from the messages in FIG. 5 and that can be used to create and match subscriber records.

TABLE 4

| Message | Extracted Data |
| --- | --- |
| 51 - Attach Request/RAU Request | IMSI, PTMSI, TLLI, RAI |
| 52 - SGSN Context Request/Identity Request | IMSI, RAI, TLLI, PTMSI, TEID, IP, Port |
| 53 - SGSN Context Response/Identity Response | IMSI, TEID, IP, Port, Current Kc, Authentication Triplets (Kc, RAND, SRES) |
| 54 - Authentication Request | TLLI, Authentication Type, RAND |
| 55 - Authentication Response | TLLI, SRES |
| 56 - XID | RAND-UI |
| 57 - Attach Accept/RAU Accept | PTMSI, TLLI |
| 58 - Attach Complete/RAU Complete | TLLI |

In one embodiment illustrated by FIG. 4, Gb Probe 306 creates a subscriber record using IMSI extracted from attach request 41. That subscriber record may be stored to database 308. Gn/Gp Probe 309 updates the subscriber record with authentication triplets extracted from SGSN context response 53. Gb Probe 306 marks the authentication key by mapping RAND in authentication request message 54 to the authentication triplets retrieved from the subscriber database. The Gb Probe may then begin deciphering the subscriber data.

In an alternate embodiment, an authentication request message may be received before authentication keys are populated into the subscriber database. For example, due to queuing delays, processor loads, or network delays, Gb Probe 306 may receive authentication request 54 before the authentication keys are populated in the subscriber record by Gn/Gp Probe 309. If Gb Probe 306 is unable to retrieve authentication information from subscriber database 308, Gb Probe 306 will try to re-fetch the key information.

Gb Probe 306 may stop processing captured messages if it is waiting for authentication keys. This would cause the probe to fall behind and it would have a difficult time catching up if the call volume was high. Also, it is inefficient to have the probe's processor to be idle while waiting for the keys. In order to avoid problems associated with unprocessed messages and idle processors, a per-subscriber wait queue is used in a preferred embodiment. When Gb Probe 306 does not have the keys necessary to decipher the subscriber data, then the messages for that subscriber will be queued, but the probe will continue to process the messages for other subscribers until the keys are received.

FIG. 6 illustrates a synchronized subscriber tracking scenario using messages captured from the Gb, Gr, and Gn/Gp interfaces. TABLE 5 lists the data that may be extracted from the protocol data units that are exchanged in embodiment of FIG. 6. MS 301 initially attempts to attach via message 61, which prompts SGSN 303 to request authentication keys from SGSN 304 in message 62. In the scenario illustrated in FIG. 6, SGSN 304 notifies SGSN 303 that is out of old keys via message 63. SGSN 303 then fetches new keys from HLR 305 via messages 64 and 65. Gb Probe 306, Gr Probe 307, and Gn/Gp Probe 309 capture the messages from the Gb, Gr, and Gn/Gp interfaces and create and update the subscriber record for MS 301.

TABLE 5

| Message | Extracted Data |
| --- | --- |
| 61 - Attach Request/RAU Request | IMSI, PTMSI, TLLI, RAI |
| 62 - SGSN Context Request/Identity Request | IMSI, RAI, TLLI, PTMSI, TEID, IP, Port |
| 63 - SGSN Context Response/Identity Response | IMSI, TEID, IP, Port, Current Kc, Authentication Triplets (Kc, RAND, SRES) |
| 64 - Send Authentication Info | IMSI |
| 65 - Send Authentication Info Ack | Authentication Triplets (Kc, RAND, SRES) |
| 66 - Authentication Request | TLLI, Authentication Type, RAND |
| 67 - Authentication Response | TLLI, SRES |
| 68 - XID | RAND-UI |
| 69 - Attach Accept/RAU Accept | PTMSI, TLLI |
| 60 - Attach Complete/RAU Complete | TLLI |

In one embodiment, Gb Probe 306 creates a subscriber record using IMSI information extracted from message 61. Gn/Gp Probe 309 updates the subscriber record with authentication triplets extracted from SGSN context response 63, if SGSN 304 has the authentication keys. Gr Probe 307 updates the subscriber record with authentication triplets extracted from send authentication info response message 65. Gb Probe 306 marks the authentication key by mapping RAND in authentication request message 66 to authentication triplets retrieved from subscriber database 308. Using the authentication key, Gb Probe 306 starts deciphering the subscriber data.

In other scenarios, the messages listed above in TABLE 5 may not include all of the listed information. This results in the need for special handling in certain exceptional cases. In one embodiment, attach request message 61 does not include optional IMSI information. In this scenario, Gb Probe 306 creates a Gb interface subscriber record using the PTMSI information. Gr Probe 307 creates a separate Gr interface subscriber record using the IMSI information in send authentication info message 64. Send authentication info messages have only IMSI information, but no PTMSI information. The Gr interface record includes RAND information, which is captured from message 65.

Gb Probe 306 captures authentication request message 66 and sends an update to the Gb interface subscriber record by passing the captured RAND and IMSI information. On receipt of the IMSI update, subscriber database 308 searches for duplicate entries and merges the Gr interface record with the Gb interface record by matching the IMSI information from both records.

As previously noted, queuing delays, probe processor loads, and network delays may result in one probe detecting and processing messages faster than another probe. For example, the Gb probe may receive authentication request message 66 before the authentication keys are populated by the Gr probe or the Gn/Gp probe. When the Gb probe fails to retrieve authentication information from the subscriber database, it attempts to re-fetch the key information by doing a configurable retry. While waiting for the keys, the Gb probe preferably continues to process information for other subscribers as the messages are received.

In some embodiments, the subscriber tracking keys may change. For example, an attach accept message or routing accept message may change the PTMSI or TLLI. The Gb probe must track both the old and new keys for this subscriber until the keys are flushed by the SGSN. The Gb probe may also have to track multiple locations, for example, if the subscriber has moved to a new location on a routing area update. The Gb probe must track both the old and new locations to successfully track the captured messages.

It will be understood that some of the interfaces in a GPRS network may not be monitored. In those cases, certain information will not be captured as the subscriber moves between monitored and unmonitored networks. In a preferred embodiment, the monitoring probes and subscriber database persistently maintain the subscriber information and dynamically match the subscriber data to existing records when a subscriber arrives at a monitored network. The subscriber database may also have an age-out mechanism to handle "stale" subscriber information. If the subscriber record is not updated or used for a configurable amount of time, then the subscriber record may be deleted. This provides a way to clear out subscriber records for visitor subscribers that briefly visit the monitored network.

In a preferred embodiment, the Gb probe maintains a subscriber data cache for faster data access. The probe may look up information in the cache based upon, for example, IMSI, PTMSI+RAI, TLLI+nodeID, or Subscriber ID.

One advantage provided by the present invention is the ability to filter the subscriber records using subscriber identities, which are not available on the original GPRS interface. With the messages merged into the subscriber records, the messages associated with a particular subscriber can be identified and analyzed separately using the present invention.

It will be understood that the subscriber record data is captured from multiple interfaces, and is processed and analyzed at near real-time. This allows operators to monitor the current status of the network. As used in this disclosure, the term near real-time means that the subscriber records are being created and updated while a connection is in progress so that information is available to the operator for the users currently accessing the GPRS network. The subscriber records are also stored and can be retrieve at a later time for historical analysis of the network operation.

Using the subscriber records described herein, service providers and operators can track the subscriber's entire call. The analysis and binding of signaling units or messages into a subscriber record provides operators with end-to-end call tracking.

In one embodiment of the invention, a system for creating subscriber records in a GPRS network comprises processors coupled to GPRS interfaces and operable to capture messages from the GPRS interfaces; a database for storing subscriber records created from the messages captured from the GPRS interfaces; a processor for combining associated subscriber records to form merged subscriber records; and a processor for subscriber tracking and deciphering messages on GPRS interfaces using information from the captured messages and the merged subscriber records. It will be understood that the processors may be embodied as separate microprocessors or as several processing entities or applications running on one or more microprocessors.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for creating subscriber records in a GPRS network, comprising:
   creating, by a first monitoring probe that monitors data packets from a first GPRS network interface, a first subscriber record using information from first data packets captured by the first monitoring probe from the first GPRS network interface;
   comparing, by a second monitoring probe that monitors data packets from a second GPRS network interface, the first subscriber record with information in second data packers captured by the second monitoring probe from the second GPRS network interface;
   if the second data packets are associated with the first subscriber record, then adding information from the second data packets to the first subscriber record;
   if the second data packets are not associated with the first subscriber record, then creating a second subscriber record using information in the second data packets;
   adding information from data packets captured from a third GPRS network interface to the first subscriber record to create an updated first subscriber record;
   comparing the updated first subscriber record with the second subscriber record; and
   combining the updated first subscriber record and the second subscriber record to create a merged subscriber record.

2. The method of claim 1 further comprising:
   comparing the first and second subscriber record with information from third data packets captured from the first GPRS network interface; and
   if the third data packets are associated with the first or second subscriber record, then adding the third data packets to the associated subscriber record.

3. The method of claim 1 further comprising:
   filtering the subscriber records using a subscriber identity.

4. The method of claim 1 wherein the creating, comparing and adding steps are performed in near real-time.

5. The method of claim 1 wherein captured subscriber information stored in subscriber records is used in historical end-to-end call tracking.

6. The method of claim 1 wherein captured subscriber information stored in subscriber records is used in real-time end-to-end call tracking.

7. The method of claim 1 wherein the first GPRS network interface is a first interface selected from Gb interface, Gr interface, Gn interface, Gp interface, and Gi interface; and wherein the second GPRS network interface is another interface, different from said first interface, selected from Gb interface, Gr interface, Gn interface, Gp interface, and Gi interface.

8. The method of claim 1 wherein the first GPRS network interface and the second GPRS network interface are different types of GPRS network interfaces.

9. The method of claim 8 wherein the different types of GPRS network interfaces comprise types selected from: Gb interface, Gr interface, Gn interface, Gp interface, and Gi interface.

10. A method for creating subscriber records in a GPRS network, comprising:
    creating a first subscriber record using information from first data packets captured from a first GPRS network interface;
    comparing the first subscriber record with information in second data packets captured from a second GPRS network interface;
    if the second data packets are associated with the first subscriber record, then adding information from the second data packets to the first subscriber record;
    if the second data packets are not associated with the first subscriber record, then creating a second subscriber record using information in the second data packets;
    adding information from data packets captured from a third GPRS network interface to the first subscriber record to create an updated first subscriber record;
    comparing the updated first subscriber record with the second subscriber record; and
    combining the updated first subscriber record and the second subscriber record to create a merged subscriber record.

11. The method of claim 10 further comprising:
    deciphering data packets on the first GPRS network interface using information in the merged subscriber record.

12. A system for creating subscriber records in a GPRS network, comprising:
    processors coupled to a plurality of different types of GPRS interfaces and operable to capture messages from the GPRS interfaces;
    a database for storing subscriber records created from the messages captured from the plurality of different types of GPRS interfaces;
    a processor for combining associated subscriber records to form merged subscriber records, wherein said processor for combining is configured to
        compare a first subscriber record, said first subscriber record created using information from first data packets captured from a first of said different types of GPRS network interfaces, with information in second data packets captured from a second of said different types of GPRS network interfaces,
        when determined that the second data packets are associated with the first subscriber record, add information from the second data packets to the first subscriber record,
        when determined that the second data packets are not associated with the first subscriber record, create a second subscriber record using information in the second data packets,
        add information from data packets captured from a third of said different types of GPRS network interfaces to the first subscriber record to create an updated first subscriber record,
        compare the updated first subscriber record with the second subscriber record, and
        combine the updated first subscriber record and the second subscriber record to create a merged subscriber record; and
    a processor for subscriber tracking and deciphering messages on GPRS interfaces using information from the captured messages and the merged subscriber records.

13. The system of claim 12 wherein the processor for combining is operable to create said first subscriber record using information from first data packets captured from said first of the plurality of different types of GPRS network interfaces.

14. The system of claim 13 wherein the processor for combining associated subscriber records is one of the processors coupled to the GPRS interfaces.

15. The system of claim 13 wherein the information from the merged subscriber records comprises an authentication triplet.

16. The system of claim 13 wherein the information from the merged subscriber records comprises an authentication key.

17. The system of claim 12 wherein the plurality of different types of GPRS interfaces comprise multiple ones of the following: Gb interface, Gr interface, Gn interface, Gp interface, and Gi interface.

18. The system of claim 17 further comprising:
a plurality of probes, wherein the plurality of probes include multiple ones of the following: Gb probe for monitoring the Gb interface, Gr probe for monitoring the Gr interface, Gn probe for monitoring the Gn interface, Gp probe for monitoring the Gp interface, and Gi probe for monitoring the Gi interface.

19. The system of claim 12 wherein the processors coupled to the plurality of different types of GPRS interfaces comprise processors of a plurality of monitoring probes that capture said messages on the GPRS interfaces, and wherein the processor for combining comprises a processor of at least one of the monitoring probe.

20. The system of claim 12 wherein said deciphering messages on GPRS interfaces using information from the captured messages and the merged subscriber records comprises: deciphering at least one message captured on a first type of GPRS interface using information from at least one message captured on a different type of GPRS interface.

21. A system for creating subscriber records in a GPRS network, comprising:
a first monitoring probe for capturing first messages from a first type of GPRS interface, wherein said first messages captured from the first type of GPRS interface comprise an encrypted message, and wherein said first monitoring probe creates a first subscriber record containing said first messages;
a second monitoring probe for capturing second messages from a second type of GPRS interface, wherein said second messages captured from the second type of GPRS interface comprise a key for decrypting said encrypted message, and wherein said second messages do not contain information for correlating said second messages with said first messages, and wherein said second monitoring probe creates a second subscriber record containing said second messages; and
a processor for correlating said key captured from the second type of GPRS interface with said encrypted message captured from the first type of GPRS interface, and decrypting said encrypted message using said key, wherein said processor is configured to
a) detect addition of information from data packets captured from a third type of GPRS interface to the first subscriber record to create an updated first subscriber record,
b) compare the updated first subscriber record with the second subscriber record, and
c) combine the undated first subscriber record and the second subscriber record to create a merged subscriber record.

22. The system of claim 21 wherein said processor comprises a processor of one of said first monitoring probe and said second monitoring probe.

23. A method for creating subscriber records in a GPRS network, comprising:
capturing, by a first monitoring probe, first messages from a first type of GPRS interface;
creating, by said first monitoring probe, a first subscriber record containing said first message;
capturing, by a second monitoring probe, second messages from a second type of GPRS interface, wherein said second messages captured from the second type of GPRS interface comprise messages that do not include subscriber identifying information;
creating, by said second monitoring probe, a second subscriber record containing said second messages;
correlating, by a processor, said second messages that do not include subscriber identifying information with corresponding ones of said first messages captured from said first type of GPRS interface that relate to a common subscriber, wherein said correlating comprises
a) detecting addition of information from data packets captured from a third type of GPRS interface to the first subscriber record to create an undated first subscriber record, and
b) comparing the updated first subscriber record with the second subscriber record to determine that the undated first subscriber record and the second subscriber record relate to said common subscriber; and
compiling information from the correlated messages into a merged subscriber record for the common subscriber.

24. The method of claim 23 wherein said subscriber identifying information comprises information uniquely identifying a given subscriber to which the message corresponds.

25. The method of claim 23 wherein said subscriber identifying information comprises international mobile subscriber identity (IMSI).

26. A system for creating subscriber records in a GPRS network, comprising:
a first network monitoring device comprising a first processor coupled to a first type of GPRS interface and operable to capture first messages from the first type of GPRS interface and create a first subscriber record containing said first messages;
a second network monitoring device comprising a second processor coupled to a second type of GPRS interface and operable to capture second messages from the second type of GPRS interface, wherein said second messages do not contain information for correlating said second messages with said first messages, and wherein said second processor is operable to create a second subscriber record containing said second messages;
a database for storing subscriber records created from the messages captured from the first and second types of GPRS interfaces; and
at least one of the first network monitoring device and the second network monitoring device being operable for combining associated subscriber records to form merged subscriber records, wherein said at least one of the first network monitoring device and second network monitoring device is configured to
a) detect addition of information from data packets captured from a third type of GPRS interface to the first subscriber record to create an updated first subscriber record,
b) compare the updated first subscriber record with the second subscriber record, and
c) combine the updated first subscriber record and the second subscriber record to create a merged subscriber record.

27. The system of claim 26 further comprising:
a processor for subscriber tracking and deciphering messages on GPRS interfaces using information from the captured messages and the merged subscriber records.

* * * * *